United States Patent [19]

Mitchell

[11] Patent Number: 4,872,931
[45] Date of Patent: Oct. 10, 1989

[54] HEAT SHRINK LABELING MACHINE WITH EXTENDED CHUCK

[75] Inventor: Monte C. Mitchell, Modesto, Calif.

[73] Assignee: B & H Manufacturing Company, Inc., Ceres, Calif.

[21] Appl. No.: 195,694

[22] Filed: May 18, 1988

[51] Int. Cl.$^4$ ............................................. B29C 53/04
[52] U.S. Cl. ....................................... 156/86; 156/215; 156/447; 156/448; 156/458
[58] Field of Search ............... 156/86, 215, 447, 448, 156/450, 456, 457, 458

[56] References Cited

U.S. PATENT DOCUMENTS

| 4,108,709 | 8/1978 | Hoffmann | 156/458 X |
| 4,406,721 | 9/1983 | Hoffmann | 156/458 X |
| 4,594,123 | 6/1986 | Eder | 156/456 |

Primary Examiner—Michael W. Ball
Assistant Examiner—Steven D. Maki
Attorney, Agent, or Firm—Edward B. Gregg

[57] ABSTRACT

Turret type labeling machine with pairs of chucks arranged coaxially and rotated orbitally about the machine axis while spinning about their individual axes. Containers are gripped between each pair of chucks, such containers having at one or both ends an inwardly sloping portion. Labels are wrapped around each spinning container with one or both edges unattached and overlapping the sloping end portion or portions. One or both chucks of each pair has an extension which provide an extension of the body surface of the container so that the projecting edge or edges of the label lies against the extension.

2 Claims, 2 Drawing Sheets

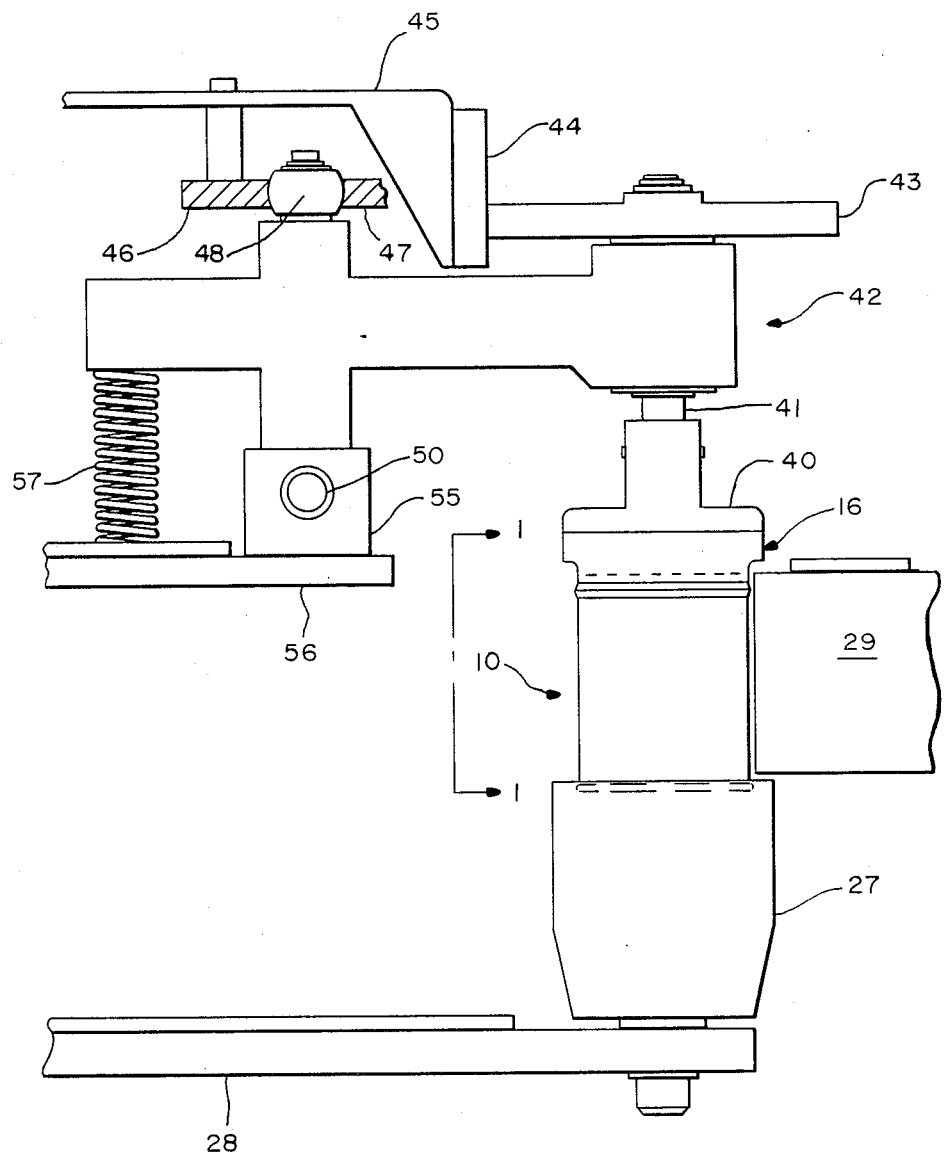
FIG.—3

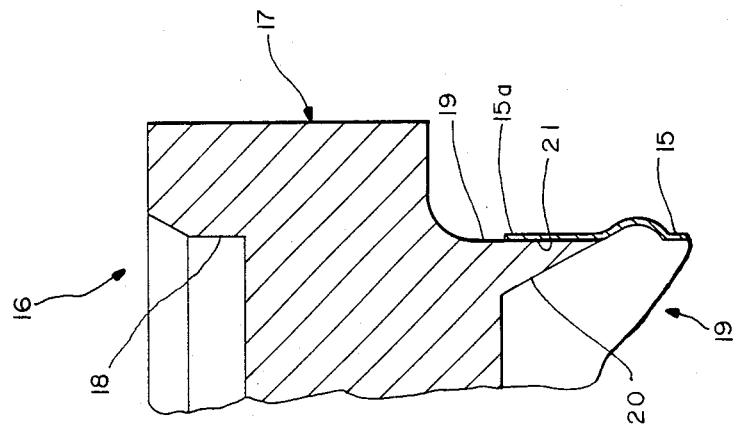
FIG.—2
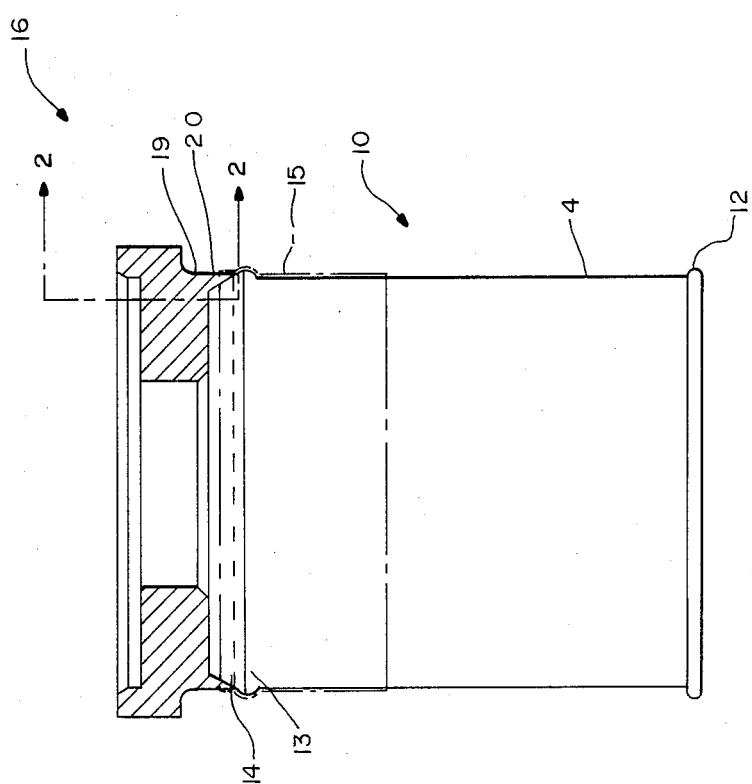
FIG.—1

HEAT SHRINK LABELING MACHINE WITH EXTENDED CHUCK

This invention relates to labeling containers with heat shrink labels.

In Hoffman, U.S. Patent No. 4,406,721 there is described and claimed a method and a machine for applying labels to containers, such labels being of heat shrinkable material. The labels are wrapped tightly around the containers and their overlapping ends (the leading end and the trailing end) are secured to the container and to one another by adhesive. The leading edge is adhered to the container by an adhesive and the trailing end, overlapping the leading end, is secured to the leading end by an adhesive. The upper and/or the lower edge(s) of the label are unattached to the wall of the container where it slopes inwardly as at the shoulder or necked in upper end of the container and the inwardly sloping lower end of the container.

Heat is then applied to the projecting, unattached edge or edges of the label to shrink the same onto the container.

As described in the aforesaid patent, an extensible, retractable tongue is extended between the projecting edge or edges of the label and the container. This tongue provides a continuation of the container body such that the overlap of the leading and trailing ends of the label have a hard surface against which they are brought, thus facilitating formation of a seam between the leading and trailing ends of the label at the projecting edge or edges of the label.

This provides a solution to the problem of seam formation at the projecting edge or edges of the label before heat shrinking takes place.

However, such mechanism requires timing of the extension and retraction of the tongue and control of the roll orientation of the container. Other difficulties may be encountered.

It is an object of the present invention to provide improvements upon the extensible-retractible tongue mechanism of U.S. Pat. No. 4,406,721.

The above and other objects of the invention will be apparent from the ensuing description and the appended claims.

It will be apparent that the invention is applicable not only to containers but to other objects, to non-cylindrical objects and to heat shrinking material other than labels.

One embodiment of the invention is illustrated by way of example in the accompanying drawings in which FIG. 1 is a section view of a chuck to be mounted on a labeling machine of the type shown in FIG. 1 of U.S. Pat. No. 4,108,709 but modified in accordance with the present invention.

FIG. 2 is a similar fragmentary view on a larger scale of the chuck shown in FIG. 1.

FIG. 3 is a view partly in vertical section showing a turret type labeling machine with the chuck of FIGS. 1 and 2 in place.

In FIGS. 1, 2 and 3 the container is shown as being in a vertical orientation but in practice it is preferred that it be horizontal.

Referring now to FIG. 1, a container 10 is shown as having a cylindrical body 11 and a top portion 12. The container is shown inverted. At its lower end the body slopes outwardly at 13, then inwardly at 14, the inwardly sloping portion being in the form of an inverted conical frustrum. A heat shrinkable label 15 is shown wrapped around the body 11 of the container 10 with its upper edge 15a projecting over the upper portions 13 and 14 of the container. (In the particular form of the invention shown, the bottom of the container has the configuration shown and is shown inverted. It will, however, be apparent that the invention is applicable to a container whose upper end or whose upper and lower ends have an inward slope.)

A chuck is shown at 16 having a body 17 formed with an opening 18 to receive a fitting which connects the chuck to a turret (see FIG. 3).

Referring to FIG. 2 as well as FIG. 1, the chuck 16 has a downwardly extending full perimeter ring portion 19 having an inwardly and upwardly sloping inner surface 20 and a cylindrical, vertical surface 21 which has the same, or substantially the same diameter at the container body 11 and over which lies the projecting portion 15a of the label 15.

Referring now to FIG. 3, except for the chuck 16 and the container 10 this figure is identical with FIG. 2 of U.S. Pat. No. 4,108,709, the description and drawings of which are incorporated herein by reference although certain parts have been omitted which are not necessary for present purposes. A rotary turret type of machine is shown at 25. The complete turret is shown in FIG. 1 of U.S. Pat. No. 4,108,709. It will be understood that adhesive may be applied to the leading and trailing ends of the label in the form of glue or that adhesive may be formed in situ on the leading and/or trailing ends of the label by means of a solvent, which is a current, well known practice. The adhesive may be present in any desired pattern; and it may be printed on; and it may be a pressure sensitive or a heat activable adhesive.

As will be seen, a container 10 is clamped between a chuck 27 mounted rotatably on an arm or spoke 28 carried by the main shaft (not shown herein but shown in FIG. 1 of the 709 patent) and the chuck 16 of the present invention. As described in the 709 patent the chuck 27 (numbered 36 in the 709 patent) may be spring loaded so that it is forced down by the chuck 16 when a container is mounted between the two chucks. Alternatively it may be mounted without spring loading.

Containers are supplied in sequence to each pair of chucks 16 and 27 (as described for the chucks 39 and 36 in the 709 patent). A vacuum drum 29 rotates about its cylindrical axis; each label is supplied to the vacuum drum by a label feed and is severed by a cutting mechanism and each severed label is held on the drum by vacuum and passes by a glue or solvent applicator which applies glue (or solvent) to the leading and trailing ends of the labels. The label is released at the line of tangency of the container 10 and the vacuum drum 29, its leading end being adhesively secured to the container at this line. The operation and apparatus referred to above are carried out by means well known in the art.

The chucks 16 and 27, with the leading end of the label attached to the container 10, are then caused to spin about their common axis while the chucks and container travel orbitally around the rotary axis of the machine 25. This spinning and orbital motion and the means for causing the same are described in the 709 patent.

The container thus labeled is removed from the labeling machine 25 and is passed through a heating chamber to heat and shrink the upper edge 15a of the label onto the portions 13 and 14 of the container. Such heating will also shrink the body of the label more tightly onto the container. Alternatively the container may be left on the machine 25 and heated as shown in FIG. 5 of U.S. Pat. No. 4,406,721.

For the sake of completeness and clarity, other elements of FIG. 3 will now be described.

The chuck 16 is carried by a chuck holder 40, being mounted thereon by any suitable means (not shown) which allows attachment and detachment. Chuck holder 40 is mounted on one end of a shaft 41 which is rotatably carried by a pivot arm 42. A wheel 43 is mounted on the other end of the shaft 41 and bears against a pad 44 carried by a frame bracket 45. The pad 44 has the shape of a segment of a cylinder such that, as the turret 25 operates the wheel 43, and with it the chuck 15 and container 10 are caused to spin.

As explained in detail in U.S. Patent 4,108,709 with reference to FIG. 2 of that patent, cams 46 and 47 act upon cam follower roller 48 to pivot arm 42 which is pivotally mounted at 50 on a bracket 55 carried by an arm 56 mounted on the frame of the machine so that the chuck 16 clears the end of the container while it is being inserted into the turret and while it is being removed from the turret after a label 15 has been wrapped around it. The spring 57 acts to hold the chuck 16 against the end of the container.

The reference numerals in the description above are different from those in the '709 patent but the construction and mode of operation will be apparent from the description above supplemented by the corresponding description in the '709 patent.

The invention has been illustrated for use with a particular type of container in which the lower end has the configuration shown at 13, 14 in FIGS. 1 and 2 and which requires shrinking an unattached label edge at only the bottom. It will be apparent that the invention is equally applicable to labeling a container where the unattached label edge is at the top, or where there are unattached edges at top and bottom; also where there is an inwardly sloping end portion as shown at 14 which slopes directly in from the container body without a rib as shown at the junction of 13 and 14. Where there is a taper or inward slope of the container at both ends, both chucks will be similarly designed; either chuck may be driven; and both chucks may be spring mounted for ease of separation of the chucks from the container once the label is secured to the container.

Among the advantages of the novel chuck 16 are the following: It provides a firm surface against which the unattached edge 15a of the label including the side seam is pressed by the vacuum drum, it does not require the timing of the tongue in U.S. Pat. No. 4,406,721; it does not require controlling the roll orientation of the chucks and/or the container; and it allows application, when desired, of a label which exceeds the height of the containers.

The invention has been described with reference to a turret which rotates the chucks in a circular path about a central axis. The invention is, however, applicable to a machine which rotates the chucks in a non-circular path, e.g., an elliptical path.

The invention has also been described with reference to a label which projects only a slight distance above or below the line of inward curvature, but the invention is applicable to a heat shrinking operation in which the label projects further, e.g., over the top or bottom of the container and is then shrunk onto the container, for example to provide a tamper evident label.

It will, therefore, be apparent that a new and useful labeling machine and method have been provided.

I claim:

1. A machine for applying a label or other sheet or film material to the cylinder surface of a cylindrical article having a body portion and two end portions, at least one of said end portions sloping inwardly from the cylinder surface of the body portion, said machine including a pair of chucks arranged in axial alignment whereby they can clamp such article between them with the ends of the article in contact with the chucks, said chucks being mounted for orbital movement about the central axis of the machine and for spinning about their individual axes, and means for imparting such orbital and spinning motion to the chucks with such an article clamped between them, at least one of said chucks being formed with an extension which is an integral part of the chuck and which overlies the respective end portion of the article and provides a smooth 360° continuation of the cylinder surface of the article, whereby when a heat shrinkable label or sheet is wrapped around the article with at least one edge thereof detached from the article, such chuck extension provides an unyielding surface bearing against the detached edge or edges.

2. A method of applying a heat shrinkable label or sheet to an article which has a body portion presenting a cylindrical surface and two end portions at least one of which slopes inwardly from the cylindrical surface, said method comprising:
   (a) providing a pair of rotatable chucks in axial alignment, such chucks being provided with means to rotate them orbitally about a central axis and, while so rotating to cause the chucks to spin about their individual axes, whereby such article clamped at its ends between the chucks is caused to undergo similar orbital and spinning movement and to wrap a label or other sheet material about the article,
   (b) continuously so operating the chucks,
   (c) continuously supplying such articles to the chucks to rotate and spin them,
   (d) continuously supplying heat shrinkable label or sheet material to the bodies of articles as they rotate and continuously spinning each pair of chucks and the respective article to wrap the sheet about it while leaving one or both edges of the sheet unattached and overlapping of the aforesaid inwardly sloping end portion or portions of the article,
   (e) then applying heat to shrink the aforesaid edge portion or portions onto the inwardly sloping end portion or portions of the article,
   (f) the chucks or chucks in contact with the aforesaid inwardly sloping end portion or portions having an extension overlying such portion or portions and providing a smooth 360° continuation of the cylindrical surface.

* * * * *